US012791507B2

(12) United States Patent
Ciobanu et al.

(10) Patent No.: US 12,791,507 B2
(45) Date of Patent: Nov. 10, 2026

(54) MEASUREMENT OF CHARACTERISTICS OF A FLUID

(71) Applicant: Georg Fischer Signet LLC, Irwindale, CA (US)

(72) Inventors: Calin Ciobanu, Brea, CA (US); Jeffrey Lawrence Lomibao, La Puente, CA (US); Jun Huang, Rowland Heights, CA (US); Jerome Brent Ford, Placentia, CA (US)

(73) Assignee: Georg Fischer Signet LLC, El Monte, CA (US)

( * ) Notice: Subject to any disclaimer, the term of this patent is extended or adjusted under 35 U.S.C. 154(b) by 217 days.

(21) Appl. No.: 18/735,693

(22) Filed: Jun. 6, 2024

(65) Prior Publication Data

US 2025/0377327 A1 Dec. 11, 2025

(51) Int. Cl.
*G01N 27/07* (2006.01)

(52) U.S. Cl.
CPC .................................... *G01N 27/07* (2013.01)

(58) Field of Classification Search
CPC ........ G01N 27/07; G01N 27/06; G01N 27/08; G01N 27/045; G01R 27/22
See application file for complete search history.

(56) References Cited

U.S. PATENT DOCUMENTS

| | | | | |
|---|---|---|---|---|
| 4,003,705 | A * | 1/1977 | Buzza | G01N 33/49 204/405 |
| 5,323,156 | A | 6/1994 | Budmiger | |
| 7,649,489 | B2 | 1/2010 | Konrad et al. | |
| 9,222,844 | B2 | 12/2015 | Rud | |
| 10,175,089 | B2 | 1/2019 | Schmid et al. | |
| 10,209,210 | B2 * | 2/2019 | Son | G01N 27/07 |
| 10,488,357 | B2 * | 11/2019 | Suzuki | G01R 27/22 |
| 10,509,003 | B2 * | 12/2019 | Vogt | G01R 27/22 |
| 2009/0267619 | A1 * | 10/2009 | Slezak | G01N 27/226 324/76.11 |
| 2018/0106743 | A1 * | 4/2018 | Vogt | G01R 27/22 |
| 2018/0340906 | A1 * | 11/2018 | Lorincz | G01N 27/08 |
| 2019/0187084 | A1 * | 6/2019 | Ichinari | G01N 27/06 |

FOREIGN PATENT DOCUMENTS

| | | | |
|---|---|---|---|
| DE | 102014008979 | A1 | 11/2014 |
| DE | 102014119510 | A1 | 6/2016 |

* cited by examiner

*Primary Examiner* — Giovanni Astacio-Oquendo
(74) *Attorney, Agent, or Firm* — Harness, Dickey & Pierce, P.L.C.

(57) ABSTRACT

A method and apparatus for measuring characteristics of the fluid using an integrator connected to a central electrode of a contacting conductivity sensor surrounded by an outer electrode.

12 Claims, 3 Drawing Sheets

MEASUREMENT OF CHARACTERISTICS OF A FLUID

FIELD

The present disclosure relates to methods for measuring characteristics of a fluid such as resistance, conductivity and the like.

BACKGROUND OF THE INVENTION

This section provides background information related to the present disclosure which is not necessarily prior art.

Contacting Conductivity Sensors are in direct contact with the Media. There are also Non-Contacting Conductivity Sensors AKA Toroidal Conductivity sensors or Inductive Conductivity Sensors.

Contacting Conductivity sensors are ideally suited for measuring resistivity/conductivity of liquids ranging from pure and ultrapure water to sea water, rinse water and chemical solutions. One of the difficulties of conductivity sensors in the past is to be able to measure fluids having a wide dynamic range. For example, the preferred dynamic range to measure conductivity is:

In Conductivity: 0.01 uS/cm to 1,000,000 uS/cm

While a preferred range in resistivity may be:

In Resistivity: 100 MOhm*cm to 1 Ohm*cm

Based on the Ohm's law definition, a conductor has the Resistance R=1 Ohm when if applying a Voltage of V=1 V (Volt) at the two extremities of a conductor, a Current of 1 A (Ampere) is flowing through that conductor.

As I=V/R, the higher the Resistance, the lower the current, or to establish a certain current when the R is fixed, the correct Voltage level has to be applied.

The inverse of the Resistance which opposes the current to flow through a conductor, is the Conductance C=1/R, which represents the ease of the current to flow through the conductor.

The Resistance or Conductance are also specific to the materials the "conductors or resistors" are built of.

$$\text{Resistance } R = (rho)^* L/S$$

where:

- Rho===ρ is the Greek letter which represents material specific characteristics for its resistance properties called RESISTIVITY
- L represents the length of the conductor
- S represents the area of the conductor cross-section A simple re-arrangement of the equation terms gets us to:

ρ =R/[L/S] if dimensions are defined in cm, the unit for ρ will be [Ohm*cm]

As the inverse of Resistance, Conductance also a material specific characteristic is:

$$C = c^* S/L$$

where:

- Conductace is measured in Siemens [S]
- c is called Conductivity, and its dimensional unit will be [S*1/cm]

When trying to measure the Resistance or Conductance of a fluid media, the challenge becomes to mechanically define the body of fluid of which the Resistance or Conductance will be measured.

If two plates of 1 sq.cm are provided facing each other at the distance of 1 cm, the Resistance or Conductance of the fluid can be measured by applying 1 V and measure the Current flowing through the fluid. Once the current is measured, the Resistance or Conductance can be determined.

Once R is known, the fluid's resistivity can be characterized as $$\rho = R/[L/S] = R/[\text{cm/cm}^*\text{cm}] = Ohm^*\text{cm}$$

In an inverse application for Conductance and Conductivity:

$$c = C/[S/L] = C/[\text{cm}^*\text{cm/cm}] = S^*1/\text{cm}$$

In practical applications, due to the wide range of the media Conductivity/Resistivity, the units to be used are:

- For Conductivity: uS/cm; mS/cm; S/cm, for most applications
- For Resistivity: MOhm*cm for the Ultra-Pure Water with the 18.18 MOhm*cm as the standard value for the Ultra-Pure Water at 25C Conductivity can be used in Ultrapure Water Measurement, as the c value for UPW is 0.055 uS/cm at 25C, but the Resistivity is more accepted by the UPW industry and easier to be numerically represented.

To address the difficulties of the Dynamic Range, the concept of Cell Constant may be used, which reduces the Dynamic range for practical resistance input values:

- Cell K=0.01; Conductivity Range: 0.01 uS/cm to 100 uS/cm; R input=1 MOhm to 100 Ohm
- Cell K=0.1; Conductivity Range: 1 uS/cm to 1,000 uS/cm; R input=100 KOhm to 100 Ohm
- Cell K=1; Conductivity Range: 10 uS/cm to 10,000 uS/cm; R input=100 KOhm to 100 Ohm
- Cell K=10; Conductivity Range: 100 uS/cm to 200,000 uS/cm; R input=100 KOhm to 50 Ohm These Cell Constants are part of the Dimensional Ratios between the distance between two electrodes and the surface they face each-other.

In the art of designing these various cell constant electrodes, it will be observed that adjusting the distance/surface ratios becomes a challenge when Conductivity is high.

The need to use an AC (alternating Voltage/Current) is due to the potential media dissociation AKA Electrolysis if DC is applied for extended time, which would lead to the media alteration and Electrode corrosion due to metal migration generated by the electrolysis phenomenon.

The industry adopted a very common way of Measuring Contacting Conductivity with addressing the above concerns of the DC approach. For example, the two electrodes are driven with a well-controlled and known AC Voltage and by measuring the Current generated by the AC Voltage the Conductivity c will be calculated as:

$$\text{Conductance } C = 1/\text{V}[uS]$$

$$\text{Conductivity } c = C^*\text{cell } K[uS/\text{cm}]$$

Nevertheless, the industry has not provided a conductivity sensor that can measure a wide range of fluid conductivity or resistivity with great accuracy.

SUMMARY

This section provides a general summary of the disclosure, and is not a comprehensive disclosure of its full scope or all of its features.

In accordance with the teachings of the present invention, a method and apparatus is provided for measuring characteristics of a fluid. The apparatus includes a sensor with an outer electrode and an inner electrode. The outer electrode having an opening to allow fluid to pass through and contact the central electrode and the outer electrode. An integrator as a positive and negative input and an output. The central electrode is connected to the negative input of the integrator. And, the output of the integrator is a function of the characteristics of the fluid.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF THE PREFERRED EMBODIMENTS OF THE INVENTION

Example embodiments will now be described more fully with reference to the accompanying drawings.

Measuring Conductivity of the Fluids is a continuous operation, and it could be recognized that the above-described method of applying a DC voltage over metal plates may create electrochemical reactions (i.e. electrolysis) in the fluids which would be detrimental and unacceptable as an analytical measurement method.

It could be appreciated that the preferred dynamic range to measure conductivity is very large.

Figure 1:
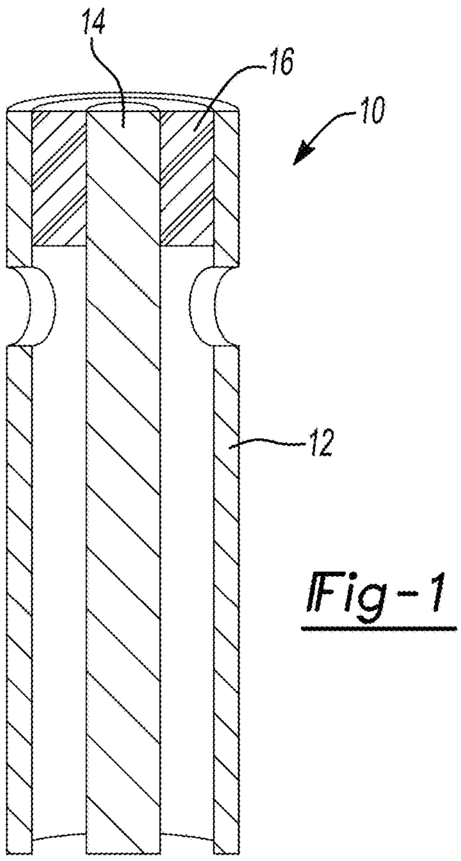
FIG. 1 is a cross-sectional view of an exemplary sensor.
Figure 2:
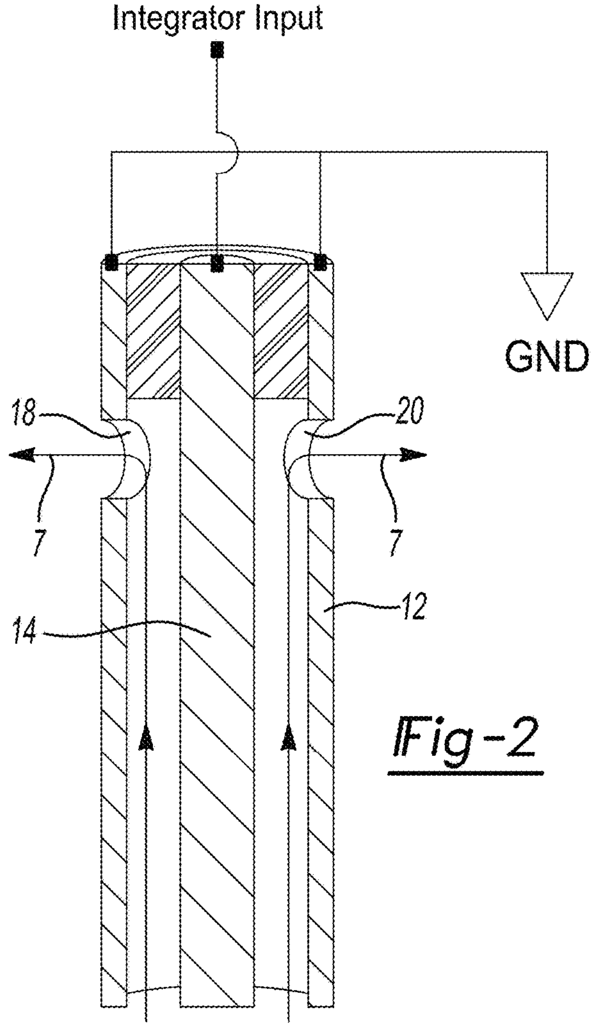
FIG. 2 is a partial cross-sectional view showing connections to the electrodes in the sensor.

FIG. 1 shows a conductivity sensor 10 of the type in which the method and apparatus of the present invention finds particular utility. Sensor 10 includes an outer metal electrode 12. A central metal electrode rod 14 is centered within the middle of electrode 12 by way of an insulator 16. As shown in FIG. 2 the outer electrode 12 is connected to ground (sometimes referred to herein as SOL_GND "Solution Ground"). The central electrode 14 is coupled to the integrator input as will be explained. Fluid F to be measured flows from the bottom opening of the outer tube and exits through openings 18 and 20 in the outer electrode 12 through the sensor 10 around the central electrode 14. Also it could be mentioned that the central electrode rod is also used as a thermal well for a RTD (resistive temperature device), as Conductivity/Resistivity values are strongly Temperature dependent and T measured is used for compensation. Moreover, the RTD value (typical 1000 Ohm and 100 Ohm at 0 deg C) could be measured using a precision ADC but the RTD could be entered as an additional R input to the integrator MUX input.

Figure 3:
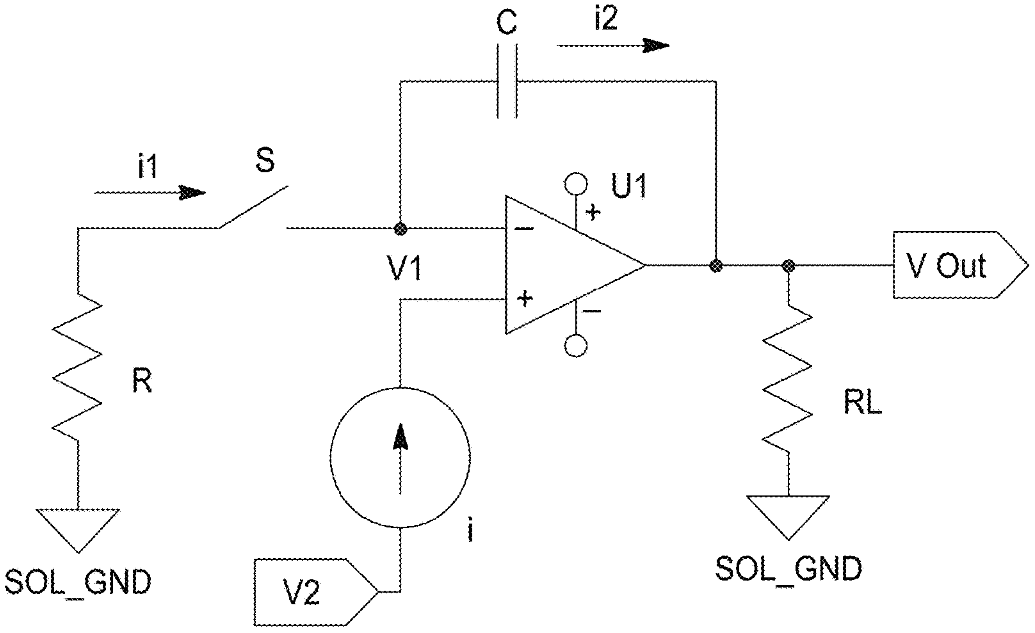
FIG. 3 is a schematic diagram of a conceptual measurement circuit.

In accordance with the teachings of the preferred embodiment, measurement apparatus for sensor 10 is provided that utilizes a Quality Operational Amplifier configured as an Integrator, as depicted FIG. 3 where:

R===Represents the Resistance of the Fluid Body

U1===Is a Quality Operational amplifier

C===Is a Precision Capacitor (typical COG/NPO class for precision and Temperature Stability)

S===is a switch for setting the Start and Stop (Open–Closed-Open)—very low R value when closed, this value is eliminated through calibration process t===duration for S to be closed, determined by the defined value for Vout SOL GND ===is the Solution Ground defined as the potential of the Sensor Outer Electrode 12

V2===is a set reference voltage for setting the Op AMP non-inverting reference Voltage Vout===is the target voltage the Capacitor should be charged From FIG. 3, the following equations are generated:

Ideal Op Amp===V1=V2; i generated by V2, i=0

^ When S closed:

$$\mathrm{V1} = i1^{*}R$$

^^ As i=0, the V1 node current summing becomes: i1=i2

$$\hat{}\hat{}\hat{}\,i2 = C^{*}(\mathrm{V1}-\mathrm{V0})/t = C^{*}(\mathrm{V2}-\mathrm{V0})/t$$

$$\text{Combining the } \hat{}, \hat{}\hat{}, \hat{}\hat{}\hat{} : \mathrm{V1}/R = C^{*}(\mathrm{V2}-\mathrm{V0})/t$$

$$\text{From the last Equation: } R = (t^{*}\mathrm{V2})/C^{*}(\mathrm{V2}-\mathrm{V0})$$

This Equation Shows that R could be measured if "t" could be accurately measured as R and t are linearly proportional.

Implementation of The Method for Accurate "t" Measurement

In order to have a continuous measurement for R, the "t" has to be measured in a controlled cycle, continuously and R to be calculated, by accurately measuring the "t".

Figure 4A:
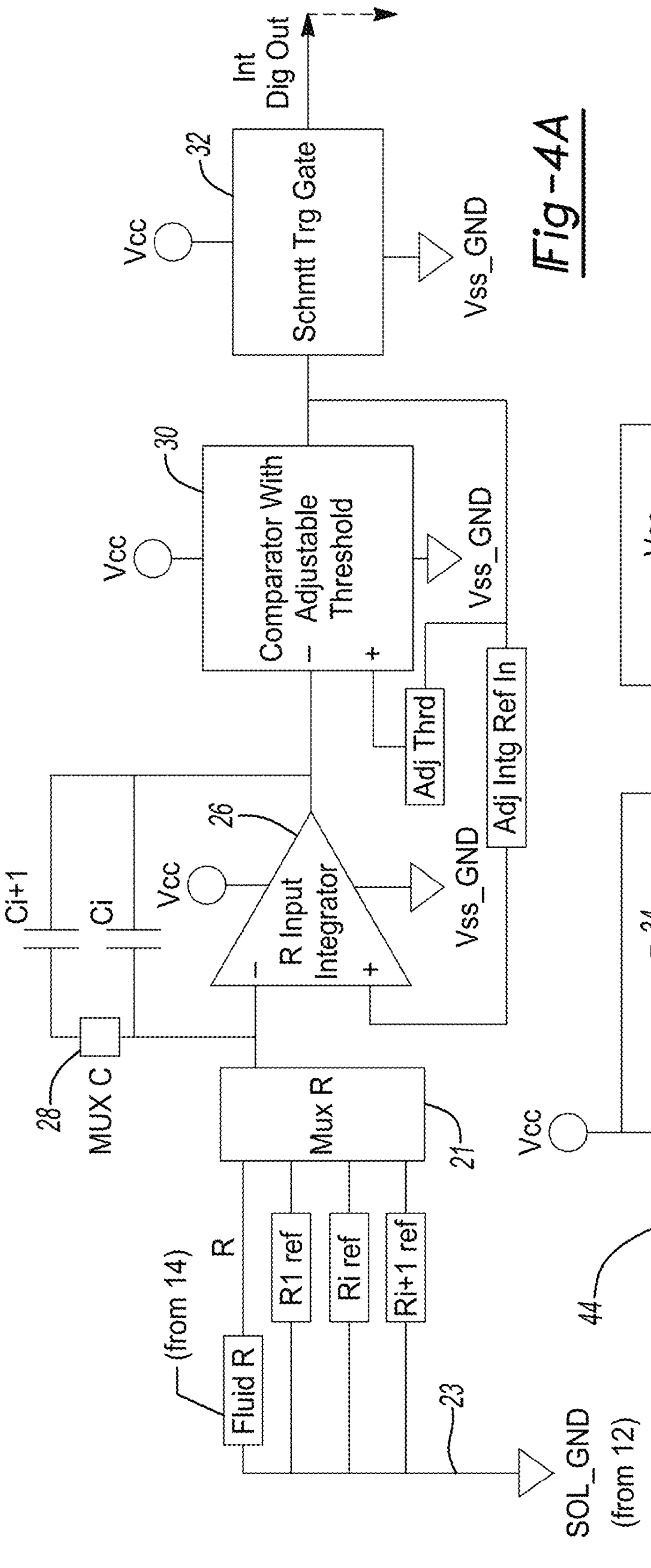
FIG. 4A is a schematic diagram of measurement circuitry according to the teachings of the preferred embodiment of the present invention.
Figure 4B:
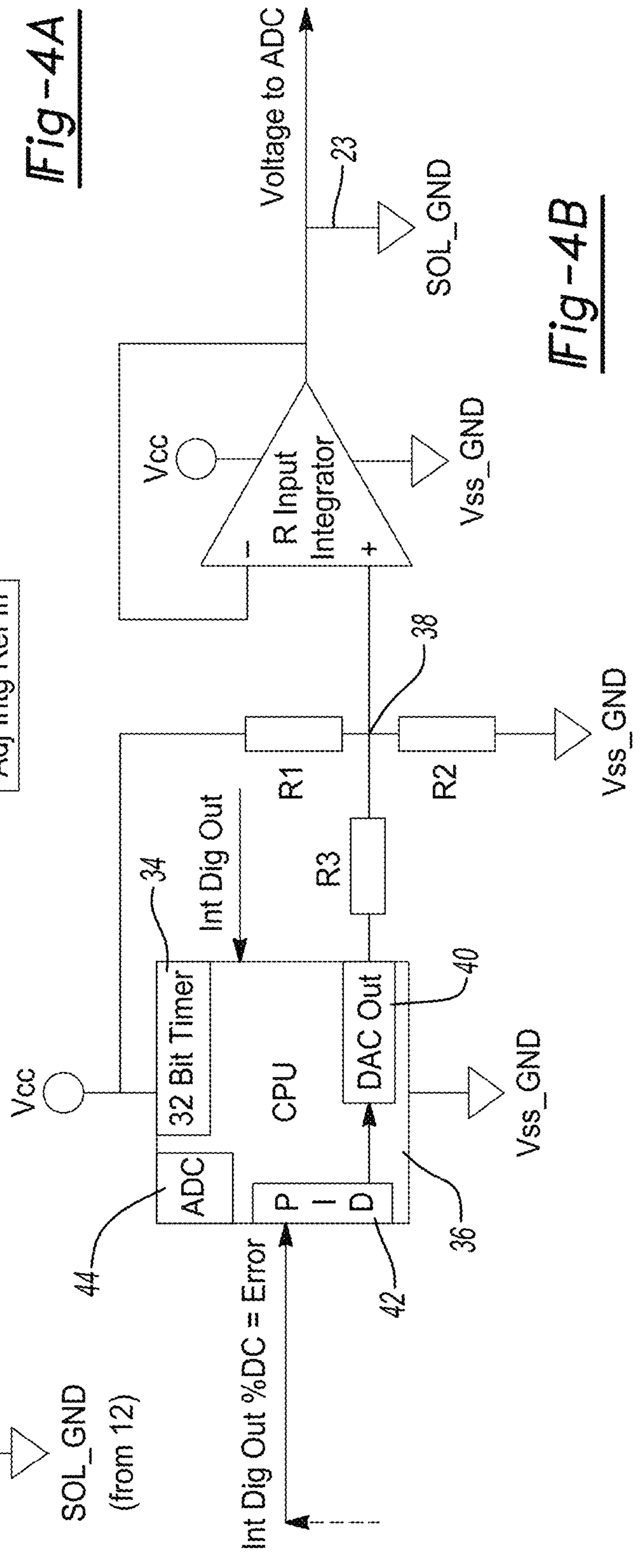
FIG. 4B is a continuation of FIG. 4A which is a schematic diagram of measurement circuitry according to the teachings of the preferred embodiment of the present invention.

FIGS. 4A and 4B combine to show a block diagram of preferred apparatus for the implementation where:

Input: Fluid R alternated with Precision Reference Resistors (R1 ref, Ri ref and Ri+1 ref) via MUX R (21) in Reference to SOL_GND (23) further described. (Could add the RTD value to be measured)

R input Integrator (26) with time constant scaling via MUX C (28).

The System is Powered by an Isolated DC Voltage Vcc/Vss_GND. The Isolation is preferred as the Sensor (AKA Contacting Conductivity) is in direct contact with the media. The ICs are powered form the Vcc/Vss power rails.

To allow the Positive—Negative Integration Output Voltages, the SOL_GND (AKA Virtual GND), is placed in the middle of the Vcc−Vss value. Example: Vcc=5V, Vss=0, therefore SOL_GND=(5V−0V)/2=2.5V The Comparator (30) Threshold Setting and the Integrator Reference Positive Input are set in Reference to SOL_GND as well.

R1 ref, Ri ref, Ri+1 ref are precision low TC (10 ppm), used to continuously Calibrating the Time Base of the integrator (26) as the Capacitors are not as reliable when it comes to precision and temperature stability. Calibration is executed continuously, using the interpolation method for the R input and the R ref i immediate higher and lower values.

The number of the Ref Resistors as well as the Capacitors (Ci+1 and Ci) are selected for the best calibration and range selection.

The Comparator (30) plays the role of Integration Start−Stop, changing Output state based on the Reference Input The Comparator Output also sets the Integrator Sign and Slope The Schmitt Trigger (Trg) Gate (32) improves the edges of the square wave for the best input to the 32 bit timer (34) in the CPU 36.

Figure 5:
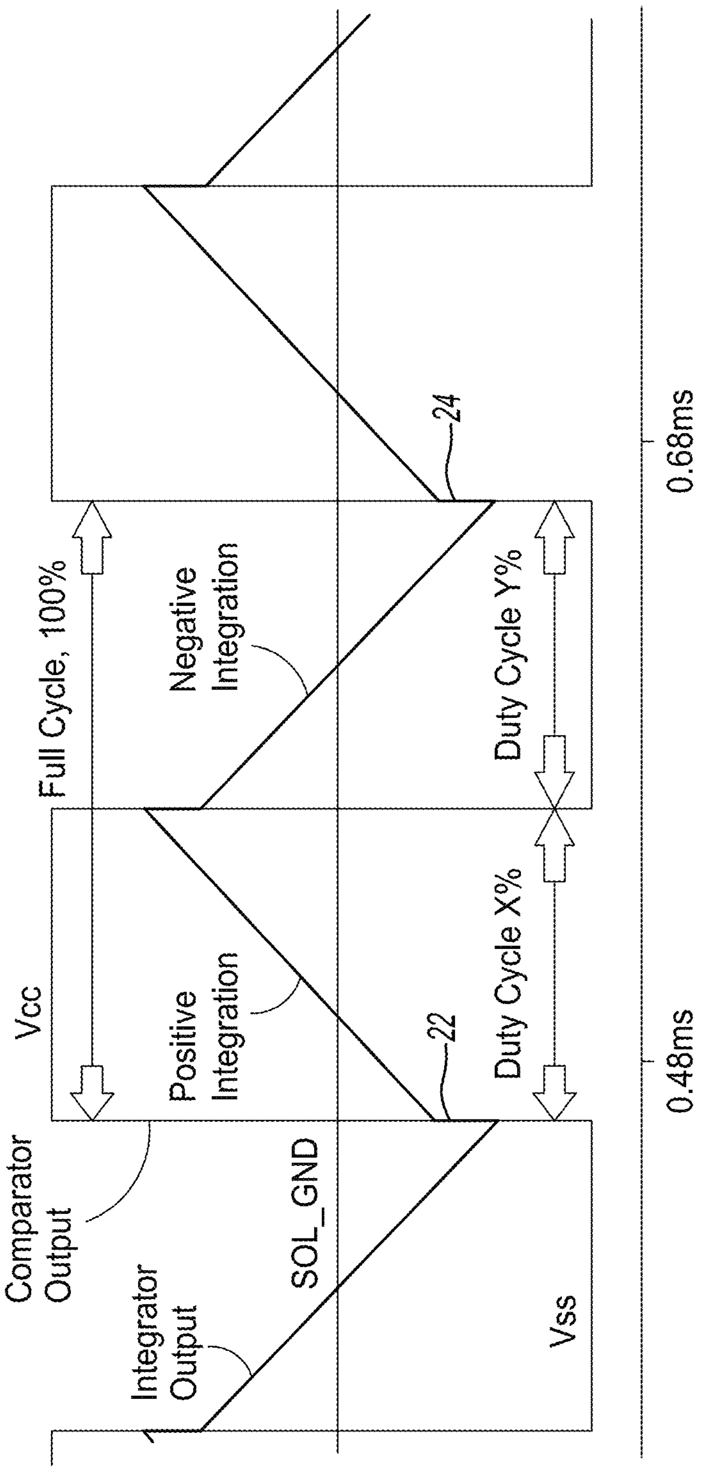
FIG. 5 is a waveform diagram.

The wave form in FIG. 5 pictures the typical behavior of the circuitry of FIGS. 4A and 4B.

The Contacting Conductivity Sensor's two Electrodes are connected with the Outer Electrode 12 to the SOL_GND 23 and with the Inner Electrode 14 to the R input to the MUX R 21.

For a given Fluid R on the input of the Integrator OP_AMP 26, the Combination R_input and C_to integrator 26 will generate the Positive Integration slope up to a value dictated by the Comparator 30 Threshold. The duration of this sequence is represented in FIG. 5 by the Duty Cycle X %.

When the Integrator 26 Output voltage equals the Threshold Voltage, the Comparator 30 output changes state, and the Negative Slope integration begins. The duration of this sequence is represented in FIG. 5 by the Duty Cycle Y %.

The Complete Integration Cycle containing both Positive and Negative integrations is represented by the Full Cycle 100%. A complete cycle corresponds to two successive rising edges 22, 24 of the comparator output.

The 32 bit Timer 34 (FIG. 4B) counts at the CPU 36 frequency the pulses between the two rising edges 22, 24 and will generate the variable COUNTS proportional to the R input to Multiplexor 22.

The CPU detects the falling edge at X % (Y %) and assesses the value for the DUTY_CYCLE. Ideal DUTY_CYCLE for SOL_GND in the middle of the Rail is 50%

The Voltage Value of the SOL_GND 23 has the tendency to be affected by the sudden changes in conductivity or other disturbance like Electrical Interference or air bubbles. This creates a counting error, hence a measurement error. The Circuitry in FIG. 4B also contains a way to control SOL_GND Voltage Value such that the DUTY_CYCLE stays always at 50%. This way, the Integrator runs symmetrically and there is no error in the R input due to wave-form non-symmetry.

The Summing point 38 of R1, R2, R3 controls the SOL_GND value. R1, R2 are the divider Rail Mid-Value (which is 2.5V or Vcc/2), while R3 may inject voltages above or below the Mid-Value in order to adjust the SOL_GND value for 50% duty cycle.

The Voltage injected through R3 is generated by the CPU_DAC 40. The Control of the DAC output is the result of a CPU implemented PI (D) controller 42 where the ERROR term is: ERROR=DUTY X %−DUTY Y %. The P and the I are tuned factors, speed of change and timing for ERROR re-assessment, for the optimum response for SOL_GND control.

For the System to have a secondary SOL_GND feedback the SOL_GND Voltage value is measured by the CPU's ADC 44 used for verification of system sanity.

The 32 bit Timer 24 could count: MAX CNT=2^32=4,294,967,296 which represent an extremely high resolution:

Example: For a CPU 36 running at 100 MHz, a 32 bit timer complete count would take 42.95 sec.

The Frequency Domain of the Integrator Circuitry described above is carefully selected to meet the basic requirements of a Liquid Analytical type of measurement. These requirements are low detectable level, accuracy, repeatability, stability and the fastest response time the process requires. The method of the preferred embodiment addresses these requirements.

As a numerical example:

Example #1

Input R=1K; this value could be measured using any Cell K Conductivity Sensor.

Assuming we have a 10 nF Capacitor in the integrator

CPU running frequency=16 MHz

The Integrator Frequency=1.784 kHz 32 bit Timer will count 8967 COUNTS every 560.45 usec With 8967 counts resolution would be well within a good SNR (Signal to Noise Ratio), as with 1000 counts, 10 CNT represents 1%.

Example #2

Input R=10 Ohm; this value could be measured only using a Cell K=10 Conductivity Sensor.

Assuming we have a 10 nF Capacitor in the integrator

CPU running frequency=16 MHz

The Integrator Frequency=178.42 kHz 32 bit Timer will count 90 COUNTS every 5.6 usec With 9 counts resolution would be not necessarily within a good SNR, as with 90 counts, 9 CNT represents 10%. High Frequency will make the Comparator's inherent delays to be comparable with the total cycle time, hence accuracy will be degraded. This is when we engage the Ci+1 in parallel (the C value becomes C=Ci+Ci+1) capacitor to increase the time constant (reduce the frequency).

For example if we add the 90 nF parallel Capacitor, C=100 nF, the Frequency becomes 17.842 KHz with 900 count and easier to achieve the 1% targeted accuracy for this extended measurement range.

Example #3

Input R=182 KOhm; this value Represents the Ultrapure Water Resistivity at 25 C when measured using a Cell K=0.01 Conductivity Sensor.

Assuming we have a 10 nF Capacitor in the integrator

CPU running frequency=16 MHz

The Integrator Frequency=9.8 Hz 32 bit Timer will count 1,632,048 COUNTS every 102.003 msec With 1,632,048 counts resolution is very good With the 102 msec per cycle, a typical 500 msec response time is adequate.

As a further example, the sensor 10 is used to measure the conductivity of 1uS/cm which is known by prior knowledge to be able to measure the resistance of between 1M and 100 Ohm.

For the Sensor with the Cell Constant=0.01 [1/cm], measuring:

1 uS/cm Conductivity is equivalent to measuring 10K Resistor Applied to the Input of the Integrator Assume that we have Rref_1 =100K (precision 0.1% and 10ppm TC)

Assume that we have Rref_2 =5K (precision 0.1% and 10ppmTC).

The two R ref are the two closest to the 10K to be measured, going up and down in value Assume C =1nF Out Values:

Rref1=100 k; f=0.178 kHz; CNT=89673

Rref2=5 k; f=3.568 kHz; CNT=4484

Rin renders an output of 8967 CNT

Determine the Slope and Offset of Rref1 and Rref2:

R calculated=1.115167*CNT Value=0.410851

Rin=1.115167*8967-0.410851=10.00033K

Accuracy =0.0033%

Example Based Conclusion

As mentioned in the functional description, to cover the complete R input from 100 Ohm to 1 MOhm, there is a need to carefully select the Integrator's running frequency, so that all the requirements are satisfied.

The method covers a complete Contacting Conductivity Sensor to measure Conductivity/Resistivity, as well as Temperature, by using as a Multiplexed input a RTD element (Resistive Temperature Device) with linear R characteristic and Values 100 Ohm, 1000 Ohm, 3000 Ohm or 10 KOhm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. Apparatus for measuring characteristics of a fluid, said apparatus comprising:

a sensor with at least an outer electrode and an inner central electrode, the sensor being configured to allow fluid to pass through and contact the central electrode and the outer electrode;

an integrator having a positive and negative input and an output;

one of the electrodes being connected to the negative input of the integrator, the other electrode being connected to Solution Ground; and the output of the integrator being a function of the characteristics of the fluid.

2. The apparatus of claim 1 which further comprises:

a comparator connected to the output of the integrator, the comparator having an output that is coupled to the positive input of the integrator, the output changing state as a function of the integrator output.

3. The apparatus of claim 2 which further comprises:

a Schmitt trigger gate connected to an output of the comparator, the Schmitt trigger generating pulses for each change of state of the comparator; and a timer connected to an output of the Schmitt trigger gate counting pulses from the Schmitt trigger gate; and wherein the pulse count from the timer is a function of the characteristics of the fluid.

4. The apparatus of claim 3 which further comprises:

a multiplexor having an output connected to the negative input of the in the greater, the multiplexer having a plurality of inputs, a first input being connected to the central electrode of the sensor, other inputs to the multiplexor being connected to one or more reference resistors, with the multiplexer selectively switching the inputs to the negative input of the integrator.

5. The apparatus of claim 4 which further comprises:

a first capacitor connected between an output of the integrator and the negative input of the integrator.

6. The apparatus of claim 5 which further comprises:

a second capacitor; and a multiplexor connected between the first and second capacitors and the negative input of the integrator.

7. The apparatus of claim 1 wherein the integrator output is configured to generate an output with a positive slope followed by an output of a negative slope, and a timer being configured to count pulses between a beginning of the positive slope and ending of the negative slope.

8. The apparatus of claim 1 which further comprises:

adjustment means for adjusting a potential on the outer electrode.

9. The apparatus of claim 8 wherein the adjustment means comprises:

a summing point of a first resistor, a second resistor and a third resistor; and a central processor (CPU) having a digital-analog-converter (DAC) connected to the first resistor.

10. The apparatus of claim 9 which further comprises:

an analog to digital converter in the CPU connected to a voltage associated with a voltage applied to the outer electrode of the sensor.

11. Apparatus for measuring characteristics of a fluid, said apparatus comprising:

a sensor with an outer electrode and an inner central electrode, the outer electrode having an opening to allow fluid to pass through and contact the central electrode and the outer electrode;

an integrator having a positive and negative input and an output;

the central electrode being connected to the negative input of the integrator;

a comparator connected to the output of the integrator, the comparator having an output that is coupled to the positive input of the integrator, the output changing state as a function of the integrator output;

a Schmitt trigger gate connected to an output of the comparator, the Schmitt trigger generating pulses for each change of state of the comparator;

a timer connected to an output of the Schmitt trigger gate counting pulses from the Schmitt trigger gate; and wherein the pulse count from the timer is a function of the characteristics of the fluid.

12. The apparatus of claim 11 which further comprises:
adjustment means for adjusting a potential on the outer electrode.

* * * * *